US009307221B1

(12) United States Patent
Tang et al.

(10) Patent No.: US 9,307,221 B1
(45) Date of Patent: Apr. 5, 2016

(54) SETTINGS OF A DIGITAL CAMERA FOR DEPTH MAP REFINEMENT

(71) Applicant: Adobe Systems Incorporated, San Jose, CA (US)

(72) Inventors: Huixuan Tang, Toronto (CA); Scott Cohen, Sunnyvale, CA (US); Stephen Schiller, Oakland, CA (US); Brian Price, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/576,936

(22) Filed: Dec. 19, 2014

(51) Int. Cl.
*H04N 5/232* (2006.01)
*H04N 13/00* (2006.01)

(52) U.S. Cl.
CPC ....... *H04N 13/0022* (2013.01); *H04N 5/23222* (2013.01); *H04N 2213/003* (2013.01)

(58) Field of Classification Search
CPC .......... H04N 13/0022; H04N 5/23222; H04N 2213/003; H04N 1/387; H04N 1/3878; H04N 1/4092; H04N 5/23232; H04N 5/33; H04N 9/045; H04N 13/0029; H04N 19/132; H04N 19/46; H04N 19/63; H04N 19/98; H04N 1/39
USPC .................................................. 348/135, 46
See application file for complete search history.

(56) References Cited

U.S. PATENT DOCUMENTS

| 8,447,141 | B2 * | 5/2013 | Barenbrug | G06T 7/0053 358/3.26 |
| 2008/0075383 | A1 | 3/2008 | Wu | |
| 2009/0268985 | A1 | 10/2009 | Wong | |
| 2012/0113100 | A1 | 5/2012 | Niioka | |
| 2012/0219236 | A1 | 8/2012 | Ali | |
| 2012/0229602 | A1 * | 9/2012 | Chen | H04N 19/597 348/43 |
| 2013/0084019 | A1 | 4/2013 | Crandall | |
| 2013/0129233 | A1 | 5/2013 | Schiller | |
| 2013/0141537 | A1 | 6/2013 | Li | |
| 2013/0258096 | A1 | 10/2013 | Ali | |
| 2013/0259315 | A1 * | 10/2013 | Angot | H04N 13/026 382/106 |

(Continued)

OTHER PUBLICATIONS

N. Asada, A. Amano, and M. Baba, Photometric Calibration of Zoom Lens Systems, Pattern Recognition, Proceedings of the 13th International Conference, Aug. 1996, vol. 1, pp. 186-190.

(Continued)

*Primary Examiner* — Hung Lam
(74) *Attorney, Agent, or Firm* — Kilpatrick Townsend & Stockton LLP

(57) ABSTRACT

Systems and methods are disclosed for identifying depth refinement image capture instructions for capturing images that may be used to refine existing depth maps. The depth refinement image capture instructions are determined by evaluating, at each image patch in an existing image corresponding to the existing depth map, a range of possible depth values over a set of configuration settings. Each range of possible depth values corresponds to an existing depth estimate of the existing depth map. This evaluation enables selection of one or more configuration settings in a manner such that there will be additional depth information derivable from one or more additional images captured with the selected configuration settings. When a refined depth map is generated using the one or more additional images, this additional depth information is used to increase the depth precision for at least one depth estimate from the existing depth map.

20 Claims, 6 Drawing Sheets

(56) References Cited

U.S. PATENT DOCUMENTS

| | | | | |
|---|---|---|---|---|
| 2014/0009574 | A1* | 1/2014 | Hannuksela | H04N 19/00769 348/42 |
| 2014/0341292 | A1* | 11/2014 | Schwarz | H04N 19/597 375/240.16 |
| 2015/0002724 | A1* | 1/2015 | Chuang | H04N 5/23293 348/346 |
| 2015/0147047 | A1 | 5/2015 | Wang | |

OTHER PUBLICATIONS

S. Bae and F. Durand, Defocus Magnification, Computer Graphic Forum, 2007, vol. 26, No. 3, 9 Pages.

J. T. Barron and J. Malik, Intrinsic Scene Properties From a Single RGB-D Image, Computer Vision Pattern Recognition (CVPR), 2013, 8 pages.

Y. Boykov, O. Veksler, and R. Zabih, Fast Approximate Energy Minimization Via Graph Cuts, IEEE Transactions Pattern Analysis Machine Intelligence, Nov. 2001, vol. 23, No. 11:Nov. 2001, pp. 1-18.

J. Chen, L. Yuan, C. Keung Tang, and L. Quan, Robust Dual Motion Deblurring, IEEE Conference on Computer Vision and Pattern Recognition (CVPR), 2008, 8 pages.

P. Favaro, Recovering Thin Structures Via Nonlocal-Means Regularization with Application to Depth from Defocus, Computer Vision and Pattern Recognition (CVPR), 2010 IEEE Conference, 8 pages.

P. Favaro, S. Soatto, M. Burger, S. J. Osher, Shape from Defocus Via Diffusion, IEEE Transactions on Pattern Analysis and Machine Intelligence, Mar. 2008, pp. 1-14.

S. Hasino, K. Kutulakos, A Layer-Based Restoration Framework for Variable-Aperture Photography, Computer Vision, IEEE 11th International Conference, 2007, 8 Pages.

S. W. Hasino, K. N. Kutulakos, Confocal Stereo, International Journal of Computer Vision, 2009, vol. 81, Issue 1, 23 Pages.

P. Henry, M. Krainin, E. Herbst, X. Ren, and D. Fox, RGB-D Mapping: Using Kinect-Style Depth Cameras for Dense 3D Modeling of Indoor Environments, International Journal of Robotics Research (IJRR), Apr. 2012, vol. 31, Issue, 17 Pages.

A. Ito, S. Tambe, K. Mitra, A. Sankaranarayanan, and A. Veeraraghavan., Compressive Epsilon Photography for Post-Capture Control in Digital Imaging. ACM TransacationsGraphics, Jul. 12, 2014, vol. 33, Issue 4, Article No. 88, 12 pages.

S. Izadi, D. Kim, O. Hilliges, D. Molyneaux, R. Newcombe, P. Kohli, J. Shotton, S. Hodges, D. Freeman, A. Davison, and A. Fitzgibbon, Kinectfusion: Realtime 3D Reconstruction and Interaction Using a Moving Depth Camera, ACM Symposium on User Interface Software and Technology, 2011, 10 Pages.

N. Joshi, R. Szeliski, and D. J. Kriegman, PSF Estimation Using Sharp Edge Prediction, IEEE Conference on Computer Vision and Pattern Recognition, 2013, 8 Pages.

C. Kolb, D. Mitchell, and P. Hanrahan, A Rrealistic Camera Model for Computer Graphics, 22nd Annual Conference on Computer Graphics and Interactive Techniques, 1995, 8 Pages.

P. Krahenbuhl and V. Koltun, Efficient Inference in Fully Connected CRFs with Gaussian Edge Potentials.117. Curran Associates, Inc., 2011, 9 pages.

M. Levoy, P. Hanrahan, Light Field Rendering, 23rd Annual Conference on Computer Graphics and Interactive Techniques, SIGGRAPH 1996, 12 Pages.

C. Liu, Beyond Pixels: Exploring New Representations and Applications for Motion Analysis, Submited to Department of electrical Engineering and Computer Science MIT, May 2009, 164 Pages.

S. Nayar and Y. Nakagawa, Shape from Focus, IEEE Transactions on Pattern Analysis and Machine Intelligence, vol. 16, No. 8:, Aug. 1994, pp. 824-831.

W. H. Press, S. A. Teukolsky, W. T. Vetterling, and B. P. Flannery, Numerical Recipes 3rd Edition: The Art of Scientifc Computing, Cambridge University Press, New York, NY, USA, 3 edition, 2007, pp. 76-79, 94, 364, 483, 534, and 981.

X. Ren, L. Bo, and D. Fox, RGB-(D) Scene Labeling: Features and Algorithms, Computer Vision Pattern Recognition (CVPR), 2012, 8 Pages.

S. Song and J. Xiao, Tracking Revisited Using RGBD Camera: Unified Benchmark and Baselines, IEEE International Conference on Computer Vision, ICCV 2013, Sydney, Australia, Dec. 2013, 8 Pages.

R. Tsai, An Efficient and Accurate Camera Calibration Technique for 3D Machine Vision, Computer Vision and Pattern Recognition (CVPR), 1986 IEEE Conference, 12 Pages.

X. Zhu, S. Cohen, S. Schiller, and P. Milanfar, Estimating Spatially Varying Defocus Blur from a Single Image, IEEE Transactions on Image Processing, 2013, pp. 1-13 Pages.

S. and T. Sim, Defocus Map Estimation from a Single Image, Elsevier, Pattern Recognition, Sep. 2011, vol. 44, pp. 1852-1858.

Carlos Hernandez, Research Blog: Lens Blur in the New Google Camper App, http://googleresearch.blogspot.com/2014/04/lens-blur-in-new-google-camera-app.html, Posted Apr. 16, 2014, accesed Jan. 21, 2015, 11 Pages.

Notice of Allowance from related U.S. Appl. No. 14/577,792 dated Dec. 3, 2015, 19 pages.

Notice of Allowance from related U.S. Appl. No. 14/552,332 dated Nov. 10, 2015, 20 pages.

* cited by examiner

SETTINGS OF A DIGITAL CAMERA FOR DEPTH MAP REFINEMENT

CROSS-REFERENCE TO RELATED APPLICATIONS

This application is related to co-pending U.S. application Ser. No. 14/552,332 filed on Nov. 24, 2014, and U.S. application Ser. No. 14/577,792 filed concurrently herewith, the contents of each is hereby incorporated in its entirety by reference.

TECHNICAL FIELD

This disclosure relates generally to methods and systems for determining configuration settings for a digital camera and a quantity of images to be captured by the digital camera using those settings for improving depth information.

COPYRIGHT NOTIFICATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Digital cameras, including digital single-lens reflex (DSLR) cameras and digital cameras integrated into mobile devices, often have sophisticated hardware and software that enables a user to capture digital images using a combination of different user-defined and camera-defined configuration settings. A digital image provides a digital representation of a particular scene. A digital image may subsequently be processed, by itself or in combination with other images of the scene, to derive additional information from the image. For example, one or more images of a scene may be processed to estimate the depths of the objects depicted within the scene, i.e., the distance of each object from a location from which the images were taken. The depth estimates for each object in a scene, or possibly each pixel within an image, are included in a file referred to as a "depth map." Among other things, depth maps may be used to improve existing image editing techniques (e.g., cutting, hole filling, copy to layers of an image, etc.).

Conventionally, depth maps are generated using one of a variety of techniques. Such techniques include depth from defocus techniques, which use out-of-focus blur to estimate depth of the imaged scene. Depth estimation using such techniques is possible because imaged scene locations will have different amounts of out-of-focus blur (i.e., depth information) depending on the camera configuration settings (e.g., aperture setting and focus setting) used to take the image(s). Estimating depth, therefore, involves estimating the amount of depth information at the different scene locations, whether the depth information is derived from one image or from multiple images of the scene. Conventionally, the accuracy of such depth estimates depends on the number of images used. Generally speaking, the greater the number of images that are input, the greater the amount of depth information that can be compared for any one position (e.g., pixel) in the scene.

Thus, many conventional depth from defocus techniques may require a dense set of input images in order to estimate scene depth with a higher degree of certainty. However, conventional techniques cannot predictively determine the optimal number of images and the corresponding camera configuration settings needed for estimating scene depth map with any particular degree of certainty. Nor can conventional techniques be used to analyze an existing depth map to predictively determine a number of additional images that could be captured of the scene with particular camera configuration settings, so that sufficiently more depth information would be available to refine the existing depth map (i.e., improve the accuracy of its depth estimates).

Accordingly, it is desirable to provide improved solutions for analyzing an existing depth map or other scene depth information to predictively determine a number of additional images to be captured of the scene, and the camera configuration settings used for capturing them, such that sufficient depth information is available for refining the depth estimates provided by the existing depth map or other scene depth information.

SUMMARY

In some examples, systems and methods are provided for predictively determining depth refinement image capture instructions for use in refining a depth map. In particular, the depth refinement image capture instructions, once determined, indicate a quantity of additional images to take, and with which aperture and focus settings to take them, such that an existing depth map may be refined with additional depth information derived from the additional image(s). Refining an existing depth map includes improving the accuracy of depth estimates in the existing depth map. Depth refinement image capture instructions are determined in a manner that is scene-dependent because data associated with the existing depth map is analyzed. For example, the techniques for generating depth refinement image capture instructions described herein take as input a combination of an all-in-focus image of a scene, an existing depth map of the scene, and/or a measure of uncertainty corresponding to the existing depth map of the scene. The all-in-focus image is an image of the underlying scene that is generated without any blur. The measure of uncertainty is a representation of the accuracy of each depth estimate in the existing depth map, which provides a depth estimate for each pixel of an image. For example, the measure of uncertainty may indicate that, for a particular pixel, a depth estimate of five meters has a particular variance. In some examples, the existing depth map is also provided as an input. However, because the depth estimates found in the depth map can be derived from the measure of uncertainty and the all-in-focus image, the existing depth map is optional to implementing the techniques described herein. In some examples, a depth likelihood corresponding to the existing depth map is also provided as an input. The depth likelihood is a mapping of probability to depth, and may be provided in the form of a depth likelihood map.

The degree to which the depth estimates in an existing depth map can be improved is measured by an improvement criterion. The improvement criterion is a sum of the increase in the depth precision (e.g., in bits) that would be possible at a given pixel in the existing depth map if a particular configuration setting is used to capture an additional image and additional depth information is derived therefrom. The improvement criterion is evaluated over a set of possible configuration settings for each pixel to determine the total degree of improvement for each pixel as a function of configuration settings. This function may be referred to herein as a voting map. The voting map indicates, for each pixel in the existing depth map, the degree to which additional depth information derived from an image captured using a particular configuration setting will improve the depth estimate at that pixel. The voting map is then used to select which configuration settings should be used to take one or more additional images of the scene.

Depth refinement image capture instructions for one or more images are then determined by analyzing the voting map. For example, the voting map may indicate that an image of the scene taken with a particular focus setting and a particular aperture setting will meaningfully improve the accuracy of the depth estimates for a sufficient percentage of the pixels of the existing depth map and that another image taken with a different focus setting and/or a different aperture setting will further meaningfully improve the accuracy of the depth estimates another sufficient percentage of the pixels. Outlying data in the voting map may be ignored so that additional images are not captured and processed for the purpose of achieving only insignificant refinements to the existing depth map.

These illustrative examples are mentioned not to limit or define the disclosure, but to provide examples to aid understanding thereof. Additional examples are discussed in the Detailed Description, and further description is provided there.

BRIEF DESCRIPTION OF THE FIGURES

These and other features, examples, and advantages of the present disclosure are better understood when the following Detailed Description is read with reference to the accompanying drawings, where.

DETAILED DESCRIPTION

Figure 1:
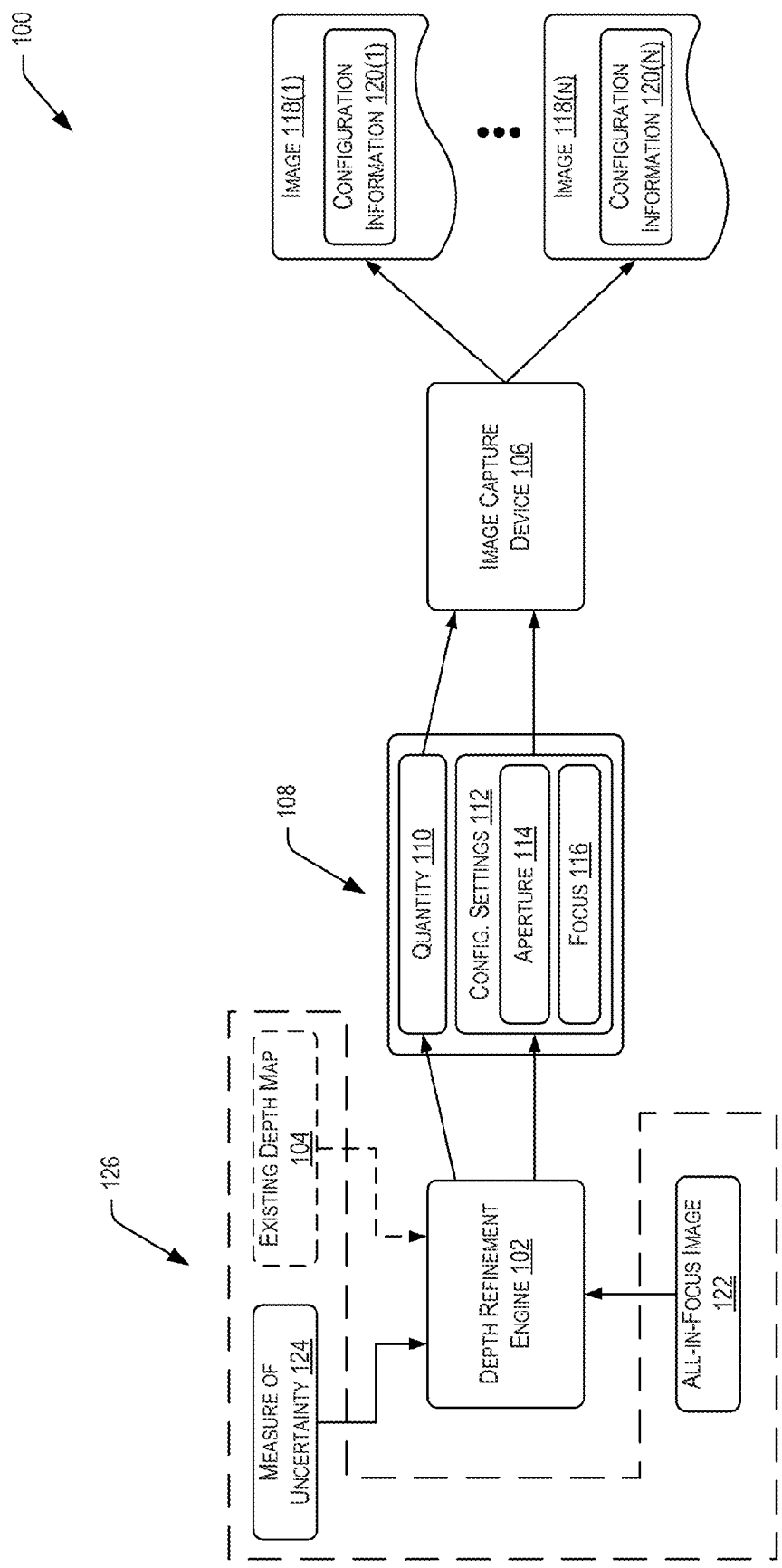
FIG. 1 is a block diagram depicting an example of a depth refinement engine, an example image capture device, and example inputs and outputs of each for determining depth refinement image capture instructions for use in depth map refinement according to at least one embodiment.

Computer-implemented systems and methods are disclosed for determining depth refinement image capture instructions for use in connection with refining an existing depth map. As introduced above, a depth map may be generated by, for example, comparing differences in defocus blur associated with two or more input images.

The techniques described herein are used to predictively determine depth refinement image capture instructions in a manner that considers the amount of possible increase in depth precision at each pixel in an existing depth map. In one example, a depth map is generated using conventional techniques or in accordance with particular techniques discussed in related disclosures incorporated by reference herein, as indicated below. A depth map includes depth information for the scene, which is typically indicated as an estimate of depth for each pixel of the image. The existing depth map may have been previously generated from one or more images of the scene captured using a digital camera. The existing depth map has a corresponding measure of uncertainty that indicates a variance for each depth estimate in the existing depth map. The existing depth map also has a corresponding depth likelihood for each depth estimate in the existing depth map. The depth likelihood is a mapping of probability to depth, and may be provided in the form of a depth likelihood map.

In some examples, analysis of the existing depth map may indicate that it provides suitable depth estimates for the scene. However, in other cases, the analysis may indicate that improved (e.g., improved as to accuracy) depth estimates can be achieved by accounting for additional depth information from one or more additional images captured using certain camera configuration settings. In some examples, this includes predictively determining how many images should be captured with the digital camera and which configuration settings (e.g., aperture settings and focus settings) should be used for capturing them.

In some examples, refining depth estimates includes determining, for each configuration setting (e.g., aperture and focus) that is of interest, whether additional depth information can be derived from an image patch of an image captured with that configuration setting can be used to discriminate between a range of possible depth values corresponding to an existing depth estimate. In some examples, the evaluated configuration settings are those configuration settings available for a particular digital camera with a particular lens. For example, a particular lens and camera combination may only have a discrete number of possible apertures settings and focus settings.

The techniques described herein take as input a combination of an all-in-focus image, an existing depth, and/or a measure of uncertainty corresponding to the existing depth and. Each of these inputs are generated using any suitable depth estimation technique and are used as described herein to determine the depth refinement image capture instructions. Using the all in-focus image and a range of possible depth values (e.g., between nine and twelve meters) determined from the measure of uncertainty for the existing depth map, image patches are simulated to determine how blurry each image patch would be at each of the possible depth values (e.g., a nine meters, ten meters, eleven meters, and twelve meters). The blurriness of an image patch corresponds to the amount of depth information that can be derived from the image patch. When considered in the frequency domain, the blurriness of the image may correspond to the amount of frequency content in the image patch. In some examples, the distances among the possible depths have a greater or smaller level of granularity. If, for a particular configuration setting of interest, a simulated image patch at a first possible depth and a simulated image patch at a second possible depth are sufficiently different in terms of blurriness, then an image captured with that configuration setting may be a good choice to refine the depth estimate of the image patch from the existing depth map. This is because the image captured with that configuration setting would enable adequate discrimination between the first possible depth and the second possible depth. This concept is referred to as depth discriminability. In some examples, a camera configuration setting is selected in a manner that maximizes depth discriminability between a range of possible depth values corresponding to the image patch.

In some examples, an improvement criterion is generated as part of the process of determining depth refinement image capture instructions. The improvement criterion indicates the sum of the increase in depth precision (e.g. in bits) possible at each pixel if a particular configuration setting (e.g., aperture setting and focus setting) of a digital camera is used. In some examples, based on the improvement criterion, the particular configuration setting that maximizes the increase in total depth precision over a scene may be selected. In any event, the improvement criterion may be evaluated over a set of possible configuration settings in order to determine a total amount of improvement in the depth precision as a function of the configuration settings. This function may be referred to herein as a voting map. The voting map combines, for each pixel in the existing depth map, "votes" as to the configuration settings that will most improve the depth estimate at that pixel. Each image patch that is analyzed provides a "vote" for the particular configuration setting that will improve its corresponding depth estimate(s). In some examples, a particular image patch votes for more than one configuration setting. The votes of all image patches may be averaged or otherwise aggregated and a configuration setting corresponding to the average or aggregate vote may be used. In some examples, determining the configuration settings of a next image to capture includes finding the location of a maximum in the voting map. In some examples, a voting map has more than one local maximum corresponding to different depth ranges that can be improved by depth information derived from images captured using different configuration settings. In this example, configuration settings corresponding to each maximum may be selected and thus the depth refinement image capture instructions may indicate that more than one additional images should be taken.

In some examples, after a quantity of images having certain configuration settings is recommended and captured, a refined measure of uncertainty, refined all-in-focus image, and refined depth map are generated. In some examples, a refined depth likelihood map is also generated. The techniques discussed above (and in more detail below) are then repeated to further refine the depth estimates in the refined depth map. In some examples, an input is received that indicates a minimum level of depth precision, a total quantity of additional images to capture, an amount of time for capturing additional images, a desire to capture additional images in a batch, or any other suitable input for constraining the determination of the depth refinement image capture instructions. Based on any one of these inputs, the selection of configuration settings for inclusion in the depth refinement image capture instructions may be adjusted. For example, if the input indicates that a user is willing to take only three additional images, the configuration settings receiving the three highest votes from the voting map (e.g., having the three greatest values) may be selected and included in the depth refinement image capture instructions.

The techniques described herein relating to generating depth refinement image capture instructions for use in depth map refinement may be used to improve existing image editing techniques. For example, the existing depth map may be an image file with depth information, a flat file with depth information, or any other suitable type of file. In any case, the depth information may be used as part of an image editing process. For example, such information may be relevant in distinguishing between foreground objects and background objects. Such a distinction may be relevant to selecting objects (whether in the foreground or background) within the image. Imagine an example scene where an image—including depth estimation information generated as described herein—depicts a child (e.g., a foreground element) standing in front of a tree (e.g., a background element). A user desiring to "clip" the child from the scene may indicate as such by selecting a portion of the child using an image editing application. The image editing application may then access the depth information, in addition to selection cues such as color and texture, to generate an outline of the child to be clipped. Thus, in some examples, the depth information may be used to supplement conventional selection cues such as colors and texture.

Turning now to the figures, FIG. 1 illustrates block diagram 100 for implementing techniques relating to determining depth refinement image capture instructions for use in depth map refinement as described herein. The block diagram 100 includes a depth refinement engine 102. The depth refinement engine 102 is configured to receive or access an existing depth map 104, a measure of uncertainty 124, and an all-in-focus image 122. Each of the existing depth map 104, the measure of uncertainty 124, and the all-in-focus image 122 may be received from a user, accessed from memory, or retrieved in any other suitable manner. The existing depth map 104 comprises depth estimates for each object in a scene, or possibly for each pixel within an image that corresponds to the scene. In some examples, the existing depth map 104 was previously outputted using a depth estimation technique. Example depth estimation techniques include: depth from defocus techniques that analyze blur in one or more images to estimate depth, and computer vision techniques that estimate depth using sets of all-in-focus images. Regardless of how the existing depth map 104 is generated, it is provided to the depth refinement engine 102. The depth refinement engine 102 is configured to analyze the existing depth map 104 and refine the included depth estimates by suggesting depth refinement image capture instructions 108.

As part of generating the existing depth map 104, a depth estimation technique may also generate the measure of uncertainty 124 and the all-in-focus image 122. In some examples, the measure of uncertainty 124 and the all-in-focus image 122 are used by a depth estimation technique to generate the existing depth map 104. The measure of uncertainty 124 comprises the variance of each depth estimate for each pixel or patch represented in the existing depth map 104. The all-in-focus image 122 represents the imaged scene as it would appear if none of the pixels in the image experienced any blur. In this manner, the all-in-focus image 122 may be considered a sharp image. In some examples, the all-in-focus image 122 is generated from one or more images of the scene that were used to generate the existing depth map 104. In some examples, the all-in-focus image 122 is captured by the camera.

The measure of uncertainty 124, the all-in-focus image 122 and, optionally, the existing depth map 104 (collectively, depth refinement input 126) are pre-computed prior to being provided to the depth refinement engine 102. In some examples, a depth likelihood map corresponding to the existing depth map 104 is also included as an input to the depth refinement engine 102. In some examples, the depth likelihood map is derived from the existing depth map 104 and the measure of uncertainty 124. In some examples, the depth likelihood map includes depth likelihoods for each pixel of the existing depth map 104, for pluralities of pixels of the existing depth map 104, for image patches of the existing depth map 104 (which may include one or more pixels), or for the entirety of the existing depth map 104. As used herein, an "image patch" refers to a small area of an image (e.g., the images 118(1)-118(N)) that includes a plurality of pixels. The depth refinement engine 102 takes the depth refinement input 126 as input and outputs the depth refinement image capture instructions 108. Ultimately, a purpose of generating the depth refinement image capture instructions 108 or at least a portion of the depth refinement image capture instructions 108 is to refine the existing depth map 104 using additional depth information derived from one or more images 118(1)-118(N) captured by image capture device 106 according to the instructions.

The depth refinement engine 102 therefore determines the depth refinement image capture instructions 108 in a manner such that the precision of the depth estimates in the existing depth map 104 can be increased when a refined depth map is generated using the images 118(1)-118(N). The increase in precision is measured according to an improvement criterion. The improvement criterion, as described in more detail herein, indicates for each pixel an amount of possible increase in depth precision for a depth estimate of the pixel. To this end, the depth refinement engine 102 determines a quantity of images 110 and configuration settings 112. The quantity of images 110 indicates the number of images (i.e., the number of the images 118(1)-118(N)) that should be taken using the image capture device 106, and the configuration settings 112 indicate the settings of the image capture device 106 for capturing the images 118(1)-118(N) such that the existing depth map 104 may be refined using depth information derived from the images 118(1)-118(N). In particular, the configuration settings 112 indicate the camera settings, in terms of aperture settings 114 and focus settings 116, that should be used when capturing the recommended number of images identified by the quantity of images 110. The aperture settings 114 relate to the amount of light let into the camera when an image is captured. The aperture of a camera is adjusted using a mechanism of blades that adjusts the amount of light. The focus settings 116 relate to a distance of a focal plane from the image capture device 106 (e.g., a digital camera) and is adjusted accordingly.

The depth refinement engine 102 not only generates each portion of the depth refinement image capture instructions 108, but also associates the portions. For example, assume that the depth refinement engine 102 determines that the quantity of images 112 that should be captured is four. The depth refinement engine 102 also associates, with each of the four images, a particular aperture setting from the aperture settings 114 and a particular focus setting from the focus settings 116. In some examples, the aperture settings 114 and the focus settings 116 for each of the additional images are different. In some examples, however, at least some of the aperture settings 114 and/or at least some of the focus settings 116 for each of the additional images are the same.

The depth refinement image capture instructions 108 are then provided to the image capture device 106. The image capture device 106 is configured according to the depth refinement image capture instructions 108 in order to capture the images 118(1)-118(N). Because the images 118(1)-118(N) are captured with the image capture device 106 according to the depth refinement image capture instructions 108, the images 118(1)-118(N) include configuration information 120(1)-120(N). The configuration information 120(1) is associated with the image 118(1), the configuration information 120(2) is associated with the image 118(2), and so forth. The configuration information 120(1)-120(N) for each of the images 118(1)-118(N) includes at least the aperture setting and the focus setting used by the image capture device 106 to capture the images 118(1)-118(N). Using depth information derived from the images 118(1)-118(N), the existing depth map 104 can be improved.

Figure 2:
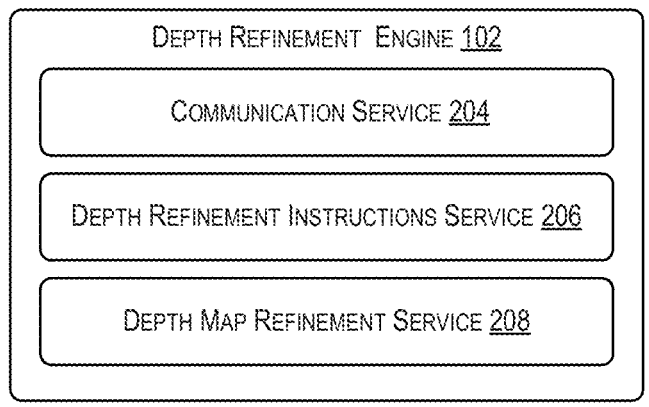
FIG. 2 is a diagram depicting an example depth refinement engine including services for determining depth refinement image capture instructions for use in depth map refinement according to at least one embodiment.

FIG. 2 illustrates an example depth refinement engine 102 for implementing techniques relating to determining depth refinement image capture instructions, as described herein. The depth refinement engine 102 is comprised of or configured to manage one or more engines, sub-engines, modules, sub-modules, components, and/or services directed to examples disclosed herein. In some examples, the depth refinement engine 102 includes a communication service 204, a depth refinement instructions service 206, and a depth map refinement service 208. While exemplary modules are illustrated in FIG. 2 and will be described as performing discrete tasks with reference to the other figures described herein, it is to be understood that other modules and/or configurations for performing other tasks and/or similar tasks as those described herein may be implemented according to the techniques described herein. The depth refinement engine 102 may be implemented on any suitable computing device, such as a user device or server device, as explained with reference to FIG. 6.

The communication service 204 is configured to manage communications between the other modules of the depth refinement engine 102 and other devices or components (e.g., hardware and/or software components) that communicate with the depth refinement engine 102. For example, the depth refinement input 126 is received by the communication service 204. In some examples, depth refinement input 126 is provided to another module of the depth refinement engine 102. For example, as discussed below, after receiving the depth refinement input 126, the communication service 204 provides the depth refinement input 126 (or a portion thereof) to the depth refinement instructions service 206. The communication service 204 also provides the depth refinement image capture instructions 108 to other modules of the depth refinement engine 102, to an operator of a digital camera, to a digital camera, to an output device (e.g., a printer), to a storage structure associated with the depth refinement engine 102, and/or to other similar locations. When the depth refinement engine 102 is implemented on the same user device configured to capture images and used to generate the depth map (e.g., a mobile device with a digital camera, a tablet computer with a digital camera, a handheld digital camera, a laptop computer with a digital camera, and other similar users devices), the communication service 204 processes requests to perform operations received from other components of that user device. When the depth refinement engine 102 is implemented as part of an image editing service (e.g., hosted on a network server), the communication service 204 processes one or more requests from user devices to access portions of the depth refinement engine 102. In some examples, other input is received by the communication service 204. In some examples, these other inputs bound and/or constraint the determination of depth refinement image capture instructions 108.

The depth refinement instructions service 206 is configured to implement the techniques relating to determining the depth refinement image capture instructions 108 for use in depth map refinement as described herein. In some examples, the depth refinement instructions service 206 determines the depth refinement image capture instructions 108 based on a portion of the depth refinement input 126. In some examples, the depth refinement image capture instructions 108 indicate the quantity of images 108 to be captured, an aperture setting 114 for each of the images, and a focus setting 116 for each of the images 118. In some examples, the depth refinement instructions service 206 identifies depth refinement image capture instructions 108 such that depth ambiguity for textured patches of constant depth within a simulated scene is eliminated. In some examples, determining the depth refinement image capture instructions 108 includes identifying a depth range in the existing depth map 104 that can be refined. In some examples, refining the existing depth map 104 includes determining the depth refinement image capture instructions 108 such that, when the images 118 are taken and depth information derived therefrom is combined with the existing depth map 104, the depth likelihoods for the depth estimates of the existing depth map 104 will be improved.

The depth map refinement service 208 is configured to refine the existing depth map 104 using depth information derived from image(s) 118 captured according to the depth refinement image capture instructions 108. In some examples, the depth map refinement service 208 also generates a refined measure of uncertainty, a refined all-in-focus image, and a refined depth likelihood as part of generating a refined depth map. In some examples, the depth map refinement service 208 generates an improved or refined depth map, and the depth refinement instruction module 206 analyzes the improved depth map to see if the improved depth map can be improved yet again. If so, the depth refinement instructions service 206 generates second depth refinement image capture instructions for capturing additional images. The additional depth information derived from these additional images 118 are provided to the depth map refinement service 208 to generate a second improved depth map. In this manner, the improvement or refinement of an existing depth map 104 may be iterative. As used herein, "iteratively" evaluating refers to sequentially evaluating and/or evaluating in parallel.

Figure 3:
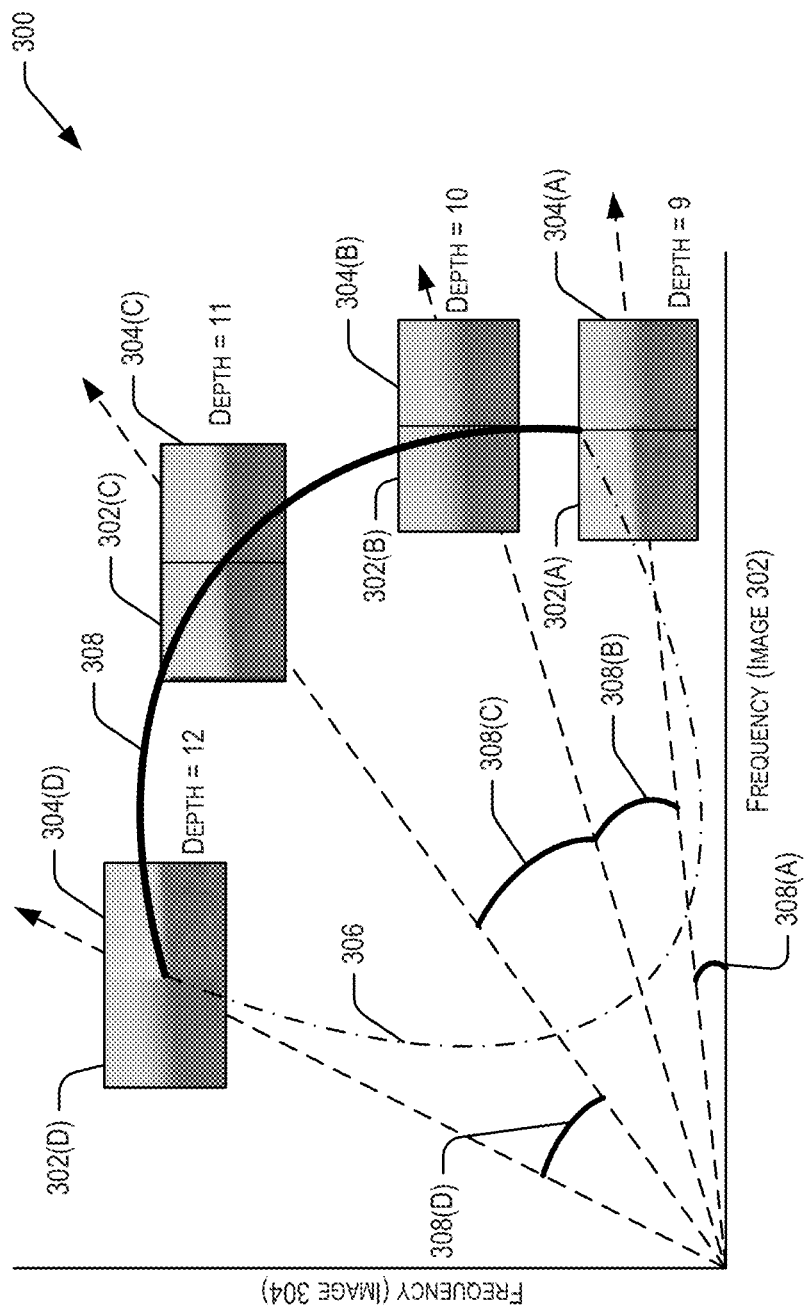
FIG. 3 is a diagram illustrating a plurality of image patches, which are analyzed for determining depth refinement image capture instructions according to at least one embodiment.

FIG. 3 illustrates an example diagram 300 depicting a plot of simulated image patches compared to actual image patches generated in accordance with techniques described herein. In some examples, such a plot may be used to identify an improvement criterion achievable for the existing depth map 104 using additional depth information derived from at least one additional image. The diagram 300 shows all-in-focus image patches 302(A)-302(D) of an all-in-focus image 122 juxtaposed with simulated image patches 304(A)-304(D). The simulated image patches 304(A)-304(D) are generated using the all in-focus image patches 302(A)-302(D) and an appropriate blur kernel for each possible depth value, focus setting, and aperture setting. As used herein, a "blur kernel" is a model of out-of-focus blur in the image acquisition process. A blur kernel may be represented by a disc of a certain radius, a polygon, a Gaussian, a square, or any other suitable feature that models out-of-focus blur during the image acquisition process. Blur kernels are predetermined from camera calibration information, which is used to generate a mapping of configuration settings (e.g., aperture settings and focus settings) to blur kernels. A blur kernel, therefore, is a function of depth, aperture setting, and focus setting.

The range of possible depths in the illustrated example is 9-12 meters. Thus, a first simulated image patch 304(A) is generated at nine meters, a second simulated image patch 304(B) is generated at ten meters, a third simulated image patch 304(C) is generated at eleven meters and a fourth simulated image patch 304(D) is generated at twelve meters. In some examples, the simulated image patches 304(A)-304(D) are plotted along an image patch manifold 306, which extends below the line used to illustrate curve 308. In some examples, the image patch manifold 306 is considered one-dimensional because depth is the only thing that changes along the curve 308 of the image patch manifold 306. Thus, regardless of whether the simulated image patches 304(A)-304(D) are 5×5, 20×20, or any other suitable size of pixel grids, the image patch manifold 306 remains one-dimensional. In some examples, the length of the curve 308 from the minimum depth (i.e., nine meters) to the maximum depth (i.e., twelve meters) corresponds to the number of bits of precision that a depth estimate in the existing depth map can be improved. In some examples, the bits of precision are also referred to the number of bins that the depth range can be divided into. Thus, in some examples, it is desirable for the curve 308 to be long, thereby allowing for a greater possible increase in depth precision. In other words, the greater the length of the curve 308, the easier it is to discriminate between the possible depth values to determine the most likely depth value for an image patch. In some examples, the increase in depth precision results in a reduction in the variance of the depth estimates of the measure of uncertainty 124.

In some examples, in order to generate the image patch manifold 306, the depth refinement engine 102 selects configuration settings for a next image to be captured such that a depth estimate for an image patch with a flat unimodal depth likelihood is refined to become a peaked unimodal depth likelihood. The depth likelihood may be represented in a graph with depth along the X-axis and probability along the Y-axis. The flat unimodal depth likelihood may correspond to a range of possible depths for the depth estimate, and the peaked unimodal depth likelihood may represent the depth estimate after the next image has been taken and an improved depth map has been generated. In some examples, the range of possible depth values for the depth estimate (i.e., the range of possible depth values over which simulated image patches 304(A)-304(D) are evaluated) is determined by finding a maximum likelihood for the depth estimate and selecting the range of possible depth values by selecting possible depth values that are less than the maximum by some percentage. In some examples, the range of possible depth values for the depth estimate includes a range of possible depth values that corresponds to a multimodal depth likelihood. In some examples, the measure of uncertainty 124 is used to determine the range of possible depth values. For example, a depth estimate from the existing depth map 104 is provided and variance (from the measure of uncertainty 124) corresponding to the depth estimate is used to determine a minimum and a maximum possible depth value. The minimum possible depth value and the maximum possible depth value may be determined by taking a number of standard deviations away from the depth estimate in decreasing depth and increasing depth, respectively.

For each possible depth value of the range of possible depth values to be evaluated, each simulated image patch 304(A)-304(D) is evaluated over a set of configuration settings (e.g., aperture settings and/or focus settings) in order to determine an improvement criterion for each configuration setting at each possible depth value. For each possible depth value, a configuration setting 112 and a corresponding blur kernel are selected. The blur kernel is used to blur the applicable all-in-focus image patch 302(A)-320(D) to obtain a corresponding simulated image patch 304(A)-304(D). The simulated image patch 304(A)-304(D) represents the amount of blur an image patch will experience at the possible depth value when the image is captured using the selected configuration setting. The process is repeated for each configuration setting 112 of interest (e.g., each configuration setting 112 available for the particular imaging device 106 used to capture the images 118).

Once the evaluation of each configuration setting 112 is completed over the range of possible depth values, or at any other time after at least two simulated image depth patches (e.g., 304(A) and 304(B)) have been generated for the corresponding all-in-focus image patches (e.g., 302(A) and 302(B)), the image patch manifold 306 is computed. The image patch manifold 306 indicates the bits of depth precision by which the depth estimate can be improved. The image patch manifold 306 is considered a 1-D manifold because it is one dimensional as to depth. In other words, along the image patch manifold 306 are plotted each of the simulated image patches 304(A)-304(D) for each possible depth value for the first set of configuration settings. A greater angle (e.g., 308(A)-308(D)) between the different simulated image patches 304(A)-304(D) indicates greater depth discriminability for their depth estimates.

The overall length of the image patch manifold 306 for the first configuration setting is computed. In some examples, computing the length of the image patch manifold 306 is performed by taking a measure of distance between patch appearances for each pair of simulated images 304(A)-304(D) corresponding to adjacent possible depth values. Next, the measures of distance between the patch appearances are summed to determine a measure of the length of the image patch manifold 306. In the illustrated example, the length of the image patch manifold 306, therefore, corresponds to the summation of: the measure of distance between simulated image patches 304(A) and 304(B); the measure of distance between simulated image patches 304(B) and 304(C); and the measure of distance between simulated image patches 304(C) and 304(D). In some examples, patch appearance comprises blurriness of the patches, which may be represented in the frequency domain or the patch domain.

The length of the image patch manifold 306 corresponds to the improvement in terms of bits of depth precision that can be achieved in the depth estimate for the image patch using the first configuration setting. When the length of the manifold 306 is long, that indicates there is good depth discriminability between the possible depth values using the selected configuration setting. If the selected configuration settings provides low depth discriminability, then the length of the image patch manifold 306 will be shorter. A poor choice of configuration setting is one that results in a very short image patch manifold 306. This means that it will be difficult to discriminate between the possible depths within the range of possible depths values.

In some examples, the length of the curve 308 and/or the image patch manifold 306 corresponds to the improvement criterion. In some examples, a voting map is generated to aggregate improvement criteria for each image patch. In effect, each image patch provides a "vote" for the configuration setting that will produce a next image 118 of the scene from which sufficient depth information can be derived and used to achieve an increase the depth precision for the image patch's depth estimate. The voting map may indicate votes for each pixel represented in the existing depth map 104 or at least those pixels represented in the portion of the existing depth map 104 that has been evaluated. Due to overlapping image patches including common pixels, multiple votes may have been provided for at least some pixel represented in the voting map. The configuration setting(s) 112 receiving the most votes may be used to generate the depth refinement image capture instructions 108. In some examples, the votes are tallied, in other examples they may be averaged or otherwise aggregated. In some examples, the votes may be combined into a matrix that includes combinations of aperture settings 114 and focus settings 116 and the amount of possible increase in depth precision for each pixel. In some examples, outlying votes are ignored so that additional images 118 are not captured and processed for the purpose of achieving only insignificant refinements to the existing depth map 104.

The voting map may be unimodal or multimodal. In some examples, a highest peak (representing the greatest number of votes) in the voting map is selected and used to generate a depth refinement image capture instruction 108. In some examples, the highest peak is the only peak, i.e., the voting map is unimodal. In some examples, the voting map will have multiple peaks, i.e., will be multimodal. In such cases, a number of peaks may be selected and used to generate depth refinement image capture instructions 108 indicating that multiple additional images 118 should be captured.

In some examples, the quantity of images 110 to be captured may correspond to or be constrained by user input. For example, the user input may indicate a mode to guide details about what a user is willing to do to improve the depth estimates in the existing depth map 104. A mode may comprise a single best shot mode, a best number of shots mode, a best batch mode, a time mode, or any other suitable mode. The single best shot mode indicates that the user is willing to take a single image in order to improve the depth estimates. In this example, the most significant peak in the voting map is selected. The best number of shots mode indicates that the user is willing to take a predetermined number of shots in order to improve the depth estimates. In this example, the user designates a whole number (i.e., 3) and the corresponding number of most significant peaks in the voting map will be selected. The best batch mode indicates that the user is willing to capture the images in a batch. The time mode indicates a time that the user is willing to spend to capture additional images 118 and/or wait to refine the existing depth map 104. For example, the user may indicate, whether by using the time mode or otherwise, that the user is only willing to spend three seconds to capture the images 118. Based on this input and in accordance with techniques described herein, the quantity images to be captured and/or the iterations of the process for determining depth refinement image capture instructions may be adjusted.

Figure 4:
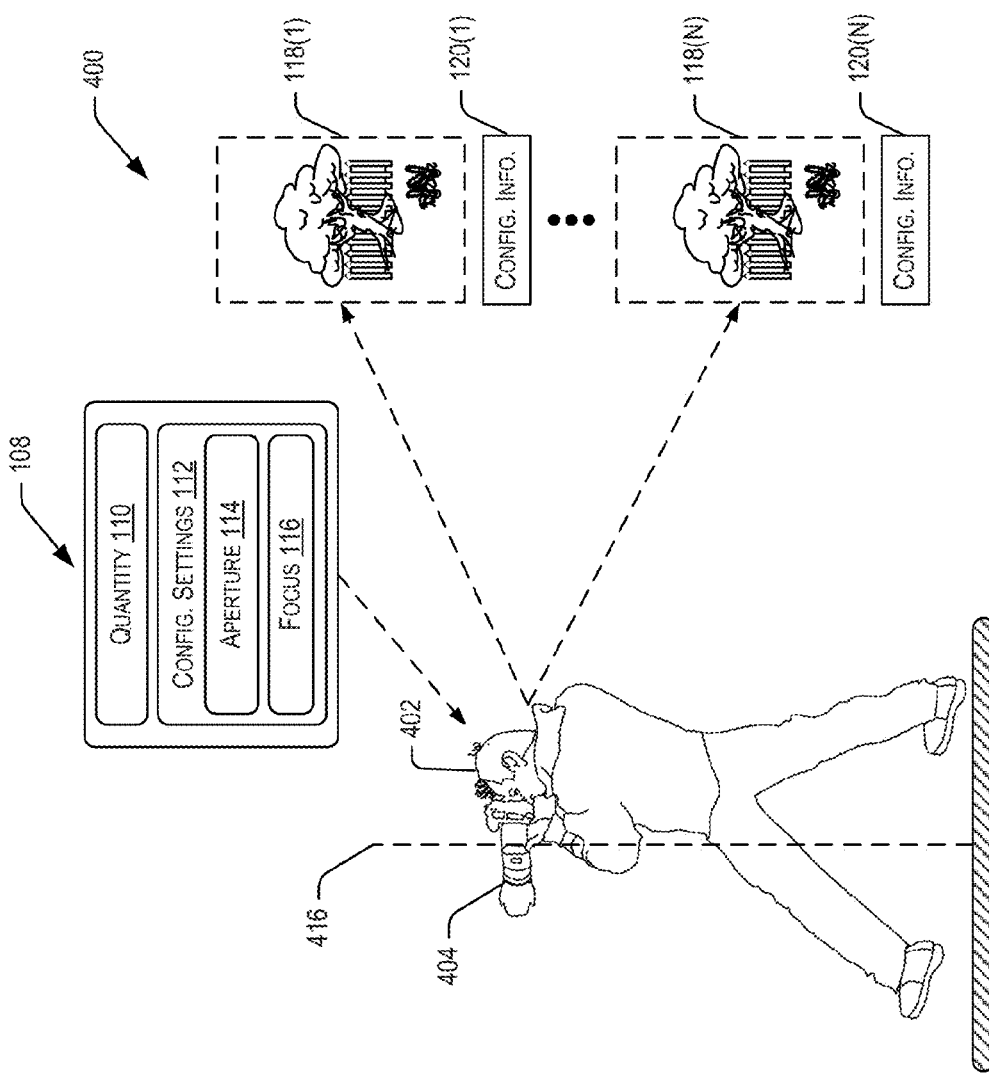
FIG. 4 is an example environment including a user capturing a scene according to depth refinement image capture instructions according to at least one embodiment.
Figure 4:
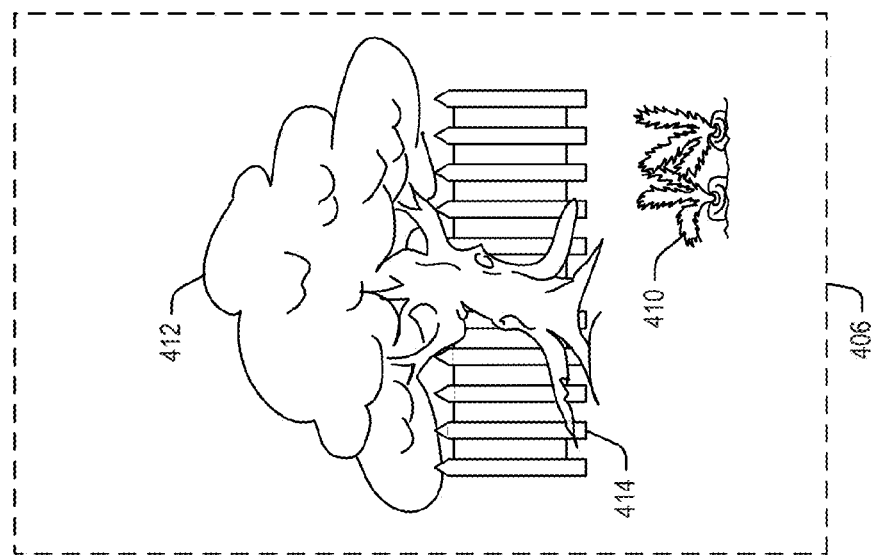

FIG. 4 illustrates an example environment 400 for implementing techniques relating to determining depth refinement image capture instructions for use in depth map refinement as described herein. The environment 400 includes an operator 402 utilizing a digital camera 404 to capture an image of scene 406. The operator 402 is optional to implementing the techniques described herein. In some examples, the digital camera 404 is mounted on a tripod or other suitable device and the images of the scene 406 are captured programmatically with little or no assistance from the operator 402. The operator 402 is situated at a viewpoint 408 while the operator 402 captures the image of the scene 406. The scene 406 includes a plurality of objects 410-414. In particular, three objects of the scene 406 are illustrated in environment 400, which are carrots 410, a tree 412, and a fence 414. As illustrated, the carrots 410 appear more in the foreground of the scene 406, while the tree 412 and the fence 414 appear more in the background. Regardless of where the objects 410-412 appear in the scene, each is defined as having a distance from the operator 402. In some examples, the distance of each object within the scene 406 is measured relative to a line 416 that intersects a lens of the digital camera 404.

In some examples, the digital camera 404, other user device, or service, in accordance with techniques provided herein, generate the depth refinement image capture instructions 108 (e.g., the quantity of images 110 and the configuration settings 112 including the aperture settings 114 and the focus settings 116), which are provided to the operator 402 or the digital camera 404. The depth refinement image capture instructions 108 instruct the operator 402 and/or the camera 404 how to particularly capture the images 118(1)-118(N). In some examples, the depth refinement image capture instructions 108 are stored in a look-up table which is accessible by the operator 402 and/or the digital camera 404. For example, a hardcopy of a portion of the look-up table may be provided to the operator 404 and the operator 404 may manually adjust the configuration settings of the digital camera 404 to capture the images 118 in accordance with the depth refinement image capture instructions 108. In some examples, the depth refinement image capture instructions 108 are generated and stored in memory of the digital camera 404 or other user device for use at a later time. In some examples, the depth refinement image capture instructions 108 particular to the digital camera 404 because they rely on calibration data particular to the digital camera 404.

In some examples, prior to a first image 118(1) being captured, the depth refinement image capture instructions 108 may have indicated a first aperture setting 114 and a first focus setting 116 for use by the camera 404 while capturing the image 118(1). Accordingly, the operator 402 adjusts the digital camera 404 according to the first aperture setting 114 (selected out of, for example, f/1.2, f/2, f/4, f/5.6, f/8, f/16, f/22 or other suitable aperture settings) corresponding to the first image 118(1) as identified by the depth refinement image capture instructions 108. The operator 402 then focuses the digital camera 404 according to the first focus setting 116 corresponding to the first image 118(1) as identified by the depth refinement image capture instructions 108 and captures the image 118(1) representing the scene 406 using the digital camera 404.

Similarly, in some examples, prior to a second image 118(2) being captured, the depth refinement image capture instructions 108 may have indicated a second aperture setting 114 and a second focus setting 116 for use by the camera 404 while capturing the image 118(2). The operator 402 then adjusts the digital camera 404 according to the second aperture setting 114 (selected out of, for example, f/1.2, f/2, f/4, f/5.6, f/8, f/16, f/22 or other suitable aperture settings) corresponding to the second image 118(2) as identified by the depth refinement image capture instructions 108. The operator 402 then focuses the digital camera 304 according to the second focus setting 116 corresponding to the second image 118(2) as identified by the depth refinement image capture instructions 108 and captures the image 118(2) representing the scene 406 using the digital camera 404. In some examples, the operator 402 captures more images 118 with the same or different aperture settings 114 and focus settings 116. Because the captured images 118(1)-118(N) have particular blur characteristics from which depth information can be derived and used to improve the existing depth map 104, they can be used by the depth refinement engine 102 and/or the depth generation engine 212(A) or 212(B) to output one or more improved depth maps.

Techniques relating to determining depth refinement image capture instructions 108 for use in depth map refinement have been introduced and described above. In some examples, certain features of the techniques described above may be implemented in accordance with the equations discussed and provided below.

In some examples, high depth precision may be needed for ground-truth depths and low precision may be needed for depths where there are no objects. Thus, in some examples, the techniques described herein may be applied to determine additional images 118 in order to refine depths in areas of low contrast.

In some examples, a good estimation of hidden image frequencies may have been acquired previously in accordance with techniques described herein and/or other techniques. Blur kernels may be assumed to be $\{\psi_n, n=1 \ldots N\}$, and the captured images may $\{i_n\}$, the posterior distribution of the all-in-focus image may a Gaussian with mean $$\overline{H}(\xi) = \frac{\sum_n I_n(\xi) \Psi_n(\xi)}{\sum_n \|\Psi_n(\xi)\|^2} \tag{1}$$

and inverse variance $$\lambda_N^{-1}(\xi) = \sum_n \|\Psi_n(\xi)\|^2. \tag{2}$$

By inspecting the likelihood function computed from the last N images, a depth range of ambiguity $[d_{min}, d_{max}]$ for each image patch may be determined. In some examples, this may be achieved by examining if the unimodal condition has been served, but more conveniently, it may be determined by comparing to an empirical threshold a range of depth values where $\Delta \mathcal{E}(d, \hat{d}) \leq \tau \eta^2$. In some examples, it may be desirable to divide the bin of ambiguity into a refined set of bins, and ensure the likelihood of individual bins is contrasted enough.

Therefore, depth refinement may be seen as a classification problem. In some examples, the distribution of the defocused patch for each depth bin from the posterior hidden image distribution from the previous batches, as well as the lens settings for an additional image, may be computed. Next, the image patch in the additional image may provide a noisy observation, and its depth may be estimated by assigning it to the closest cluster.

In some examples, an image patch manifold $\mathcal{M}_h = i(\sigma)$ that may correspond to defocus patches of the same hidden image may be computed. As only the defocus level varies, the image patch manifold may be a 1-D manifold numerically simulated.

In some examples, the risk of erroneous depth assignment may be bounded by ensuring that the clusters for each depth bin are suitably separated. Since the distance between any pair of cluster may be typically larger than their distance on the manifold $\mathcal{M}_h$, the number of separable classes may be bounded by the length of the 1-D manifold.

$$l(\sigma_{min}, \sigma_{max}) = \int_{\sigma_{min}}^{\sigma_{max}} \left\|\frac{\partial i_h(\sigma)}{\partial \sigma}\right\| \left\|\frac{\partial \sigma}{\partial d}\right\| dd \tag{3}$$

In some examples, the following theorem may be relevant: Let $\tau \eta^2$ be the minimal allowed image difference under any pair of depth hypotheses in the range $[d_{min}, d_{max}]$, the maximal number of separable depth bins $$M \leq \frac{l(d_{min}, d_{max})}{\tau \eta^2} + 1 \tag{4}$$

Assuming that the 1-D manifold is divided into n bins, with their centroids being $$h * k_{\sigma(d_1, f, r)}, h * k_{\sigma(d_2, f, r)}, \ldots, h * k_{\sigma(d_M, f, r)}.$$

Since the 1-2 norm between any 2 points is the shortest path between them $$l(d_k, d_{k+1}) \geq \|h * k_{\sigma(d_k, f, r)} - h * k_{\sigma(d_{k+1}, f, r)}\| \geq \tau \eta^2 \ k = 1, 2, \ldots, M-1 \quad (5)$$

Therefore $$l(d_{min}, d_{max}) = \sum_{k=1} n - 1 l(d_k, d_{k+1}) \geq (M+1)\tau\eta^2 \quad (6)$$

And thus $$M \leq \frac{l(d_{min}, d_{max})}{\tau\eta^2} + 1 \quad (7)$$

In some examples, a strategy may be developed for refining depth estimation of general scenes that collects votes from all patches in the image. In some examples, in accordance with techniques described herein, for a discrete set of σ, l(0, σ) may be preecomputed. Next, a certain configuration setting may be evaluated by:

First, computing $\sigma_{min}$ and $\sigma_{max}$ for the ambiguous depth range of each pixel.

Next, computing the vote for each image patch h.

$$v_h = \min\left(\max\left(\frac{l(0, d_{max}) - l(0, d_{min})}{\tau\eta^2}, 1, \right) M_{max}\right) \quad (8)$$

In some examples, the threshold to vote may be held to be between $[1, M_{max}]$ in order to disregard textureless areas and areas of very high certainty.

And, summing up the votes.

$$v = \sum_h v_h \omega_h \quad (9)$$

with $w_h$ being a mask which is zero where $\mathcal{E}$ (d*) in last iteration is too large.

In some examples, the final voting map may be a function $f$ and a, and may be multimodal. Therefore, all the local maximals may be selected in the voting map as the next images to capture in the next batch.

In the extreme case when $[\sigma_{min}, \sigma_{max}]$ corresponds to a very narrow range, $\mathcal{M}_h$ may be approximately linear $$\mathcal{M}_h(\sigma) = \mathcal{M}_h(\sigma^*) + \frac{\partial \mathcal{M}_h(\sigma)}{\partial(\sigma)}\bigg|_{\sigma^*} (\sigma - \sigma^*) \quad (10)$$

Under such conditions $1(d_{min}, d_{max})$ may be approximated in in closed-form $$l(\sigma_{min}, \sigma_{max}) = \quad (11)$$

$$\|\sigma_{max} - \sigma_{min}\| \sum_\xi \|H(\xi)\| \left|\frac{\partial A(\sigma\xi)}{\partial \sigma}\right|_{\sigma^*} \left\|\frac{D_f}{(d^* + B_f)^2}\right\| \frac{a_{ref}}{a}$$

and the following corollary may be derived:

In some examples, a corollary may be used to resolve ambiguity in narrow range. If $[d_{min}, d_{max}]$ is narrow enough to linearize $\mathcal{M}_h$, the focus and aperture should be chosen so that the defocus level is approximately 1.2 pixel.

In some examples, $$\left\|\frac{\partial A(\sigma\xi)}{\partial \sigma}\right\|$$

may be plotted as function of ξ and σ. After doing so, it may be observed that for a wide band of frequencies 0.2π≤ξ≤π, a defocus radius of approximately 1.2 pixels may achieve high gradient across all frequencies.

For the corollary, the following strategy for very far scenes where the defocus kernel radius does not vary a lot may be determined:

In some examples, where the scene is extremely far away, the optimal strategy for acquiring depth may be to use the focus settings producing defocus of +/−1.2 pixel and using the largest aperture available.

Figure 5:
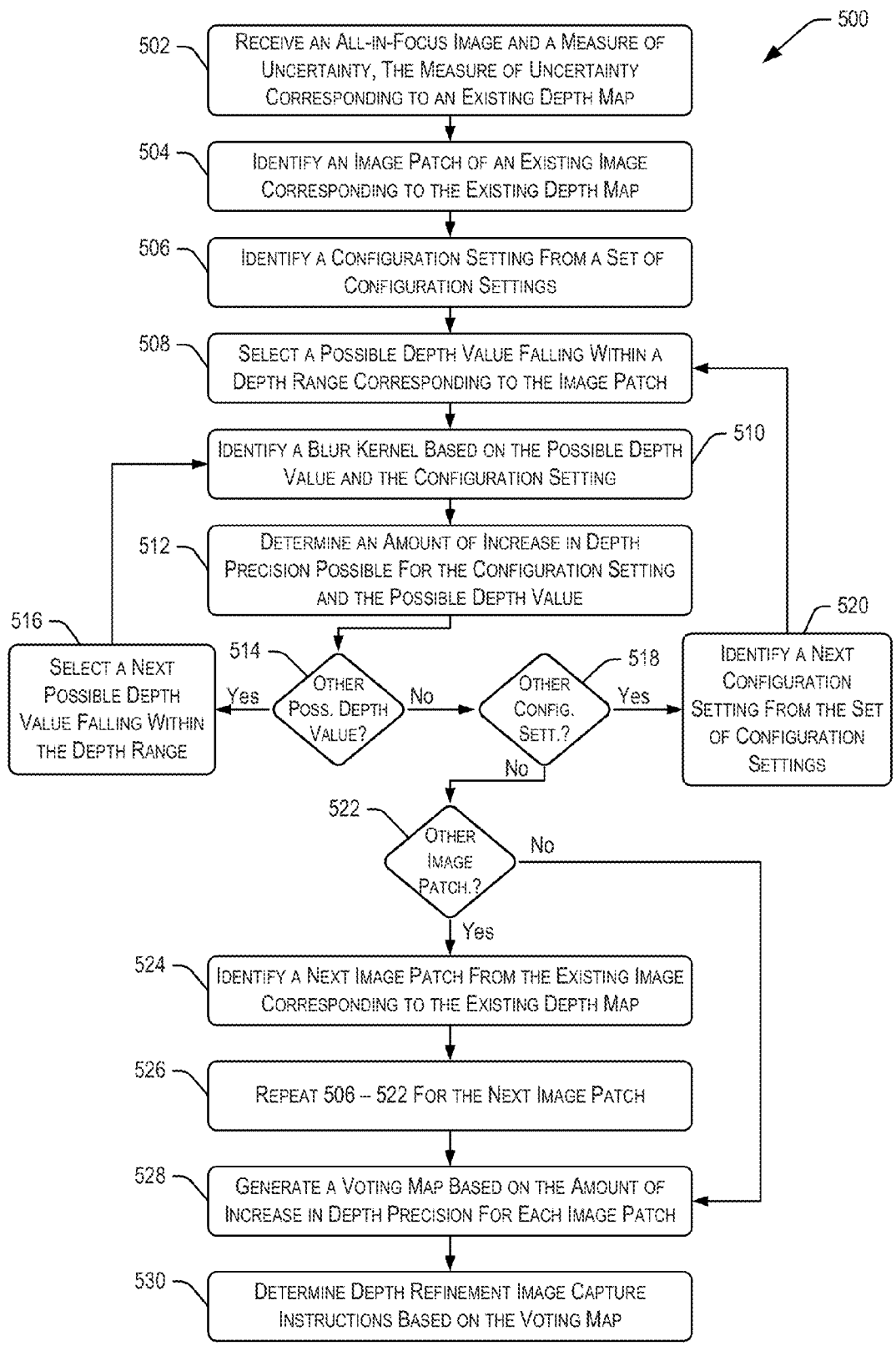
FIG. 5 is a flow chart depicting an example method for determining depth refinement image capture instructions for use in depth map refinement according to at least one embodiment.

FIG. 5 depicts an exemplary process 500 for determining depth refinement image capture instructions 108 for use in depth map refinement as described herein. Some or all of the process 500 (or any other processes described herein, or variations and/or combinations thereof) may be performed under the control of one or more computer systems configured with executable instructions for implementing the described functions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The depth refinement engine 102 (FIG. 1) may perform the process 500 of FIG. 5.

The process 500 begins at 502 by receiving an all-in-focus image 122 and a measure of uncertainty 124. In some examples, the measure of uncertainty 124 corresponds to an existing depth map 104. In some examples, the measure of uncertainty 124 indicates the relative accuracy of depth estimates for image patches from an existing image corresponding to the existing depth map 104. In some examples, the process 500 receives the existing depth map 104 and/or a depth likelihood map. In some examples, the depth likelihood map indicates likelihoods for each depth estimate included in the existing depth map 104 and may be generated by a depth likelihood function.

At 504, the process 500 identifies an image patch of an existing image corresponding to the existing depth map 104. In some examples, identifying the image patch includes selecting an image patch of the existing image located at a first position in the existing image. An image patch is small grouping of pixels in an image in which depth is assumed to be continuous. While the techniques described herein are implemented on an image patch by image patch basis, the depth estimates of the existing depth map 104 are refined on a pixel by pixel basis. In some examples, an image patch includes a plurality of pixels centered around a particular pixel.

At 506, the process 500 identifies a configuration setting 112 from a set of configuration settings. In some examples, the set of configuration settings includes aperture settings 114 and focus settings 116 available on a particular digital camera and lens combination. For example, if five focus settings 116 are available and five aperture settings 114 are available, the set of configuration settings includes twenty five configuration settings.

At 508, the process 500 selects a possible depth value falling with a depth range corresponding to the image patch. In some examples, the depth range includes a plurality of possible depth values and selecting the possible depth value includes determining the depth range corresponding to the image patch. In some examples, determining the depth range is based on the measure of uncertainty 124. For example, a maximum possible depth value and a minimum possible depth value may be located at distances away from the depth estimate of the image patch equivalent to one or more standard deviations of the variance for the depth estimate. In some examples, the depth range is determined based on the depth likelihood(s) for the patch. For example, for a unimodal depth likelihood, the depth range may be determined by selecting values that intersect with the depth likelihood and that are less probable than the peak of the depth likelihood. For example, if the depth likelihood for the depth estimate had a peak at 0.8 meters, the depths located at the intersection of a horizontal line drawn at 10% less than 0.8 meters may be used to define the depth range. In some examples, a multimodal depth likelihood corresponding to the depth estimate is used to determine the depth range. In this example, the depth range may extend from a first peak of the multimodal depth likelihood to a second peak of the multimodal depth likelihood, or may extend from some other depth less than the first peak and greater than the second peak.

At 510, the process 500 identifies a blur kernel based on the selected possible depth value and the selected configuration setting. In some examples, identifying the blur kernel includes accessing camera calibration information that indicates a mapping of configuration settings (e.g., aperture settings and focus settings) and depths to blur kernels. A blur kernel, therefore, is a function of depth, aperture setting, and focus setting. In some examples, the identified blur kernel is use to blur an all-in-focus image patch corresponding to the selected image patch to provide a simulated image patch. The simulated image patch thus corresponds to the same position in the scene as the selected image patch. The simulated image patch is a simulation of the appearance (e.g., in terms of blurriness) of the image patch at the possible depth value if the image were captured using the selected configuration setting.

At 512, the process 500 determines an amount of possible increase in depth precision for the selected image patch that can be achieved by accounting for additional depth information in an additional image 118 captured using the selected configuration setting. In some examples, the amount of possible increase in depth precision is a function of configuration settings and corresponds to an image patch manifold 306, as described with reference to FIG. 3. In some examples the length of the image patch manifold 306 is determined after the configuration setting has been evaluated over each possible depth value of the depth range (e.g., blocks 514, 516, 510, 512, until the decision at 514 is "no"). In some examples, the amount of possible increase in depth precision for the selected image patch comprises an improvement criterion for the depth range. Thus, the length of the image patch manifold 306 and/or the curve 308 running between the maximum possible depth value and the minimum possible depth value corresponds to the improvement criterion. The improvement criterion therefore indicates the amount of depth precision by which the depth estimate for the image patch can be improved. At 514, it is determined whether there are other possible depth values of the range of possible depth values identified as part of 508. If the answer at 514 is yes, the process 500 continues to 516, where a next possible depth value falling within the depth range is selected. The process 500 then returns to and is repeated from 510, where a blur kernel based on the next possible depth value and the configuration setting is selected.

When it is determined at 514 that no further possible depth values of the depth range need to be evaluated, the process 500 continues to 518 where it determines whether there are other configuration settings of interest. If so, the process 500 continues to 520 where a next configuration setting from the set of configuration settings is identified. The process 500 then returns to and is repeated from 508. When it is determined at 518 that no additional configurations settings are of interest, the process 500 continues to 522.

At 522, the process 500 determines whether there are any other images patches to be evaluated in the existing image corresponding to the existing depth map 104. If so, a next image patch is identified at 524 and at 526 the process is repeated from 506-522 for the next image patch. In some examples, certain image patches where there is no texture in the existing image, or where there is no depth estimate in the existing depth map, are ignored by the process 500. When it is determined at 522 that no additional image patches require evaluation, the process 500 continues to 528 where a voting map is generated based on the amount of increase in depth precision for each image patch. In some examples, a voting map is generated for each pixel and is as a function of configuration settings (i.e., indicates which configuration settings will improve the depth estimates for each pixel represented in the existing depth map 104).

At 530, the process 500 determines at least one depth refinement image capture instruction 108 based on the voting map. This may be performed in a variety of different ways. For example, the depth refinement image capture instructions 108 may be determined by selecting a configuration setting 112 corresponding to the location of the maximum (i.e., greatest number of votes) from the voting map. The depth refinement image capture instructions may also be determined by selecting a set of the top local maxima from the voting map. In other examples, the depth refinement image capture instructions 108 may also be determined by selecting, from the depth map, a first configuration setting 112 corresponding to a first local maximum associated with a first depth range and a second configuration setting 112 corresponding to a second local maximum associated with a second depth range. The process 500 may be repeated one or more times to generate additional depth refinement image capture instructions 108 for further refining a refined depth map.

Figure 6:
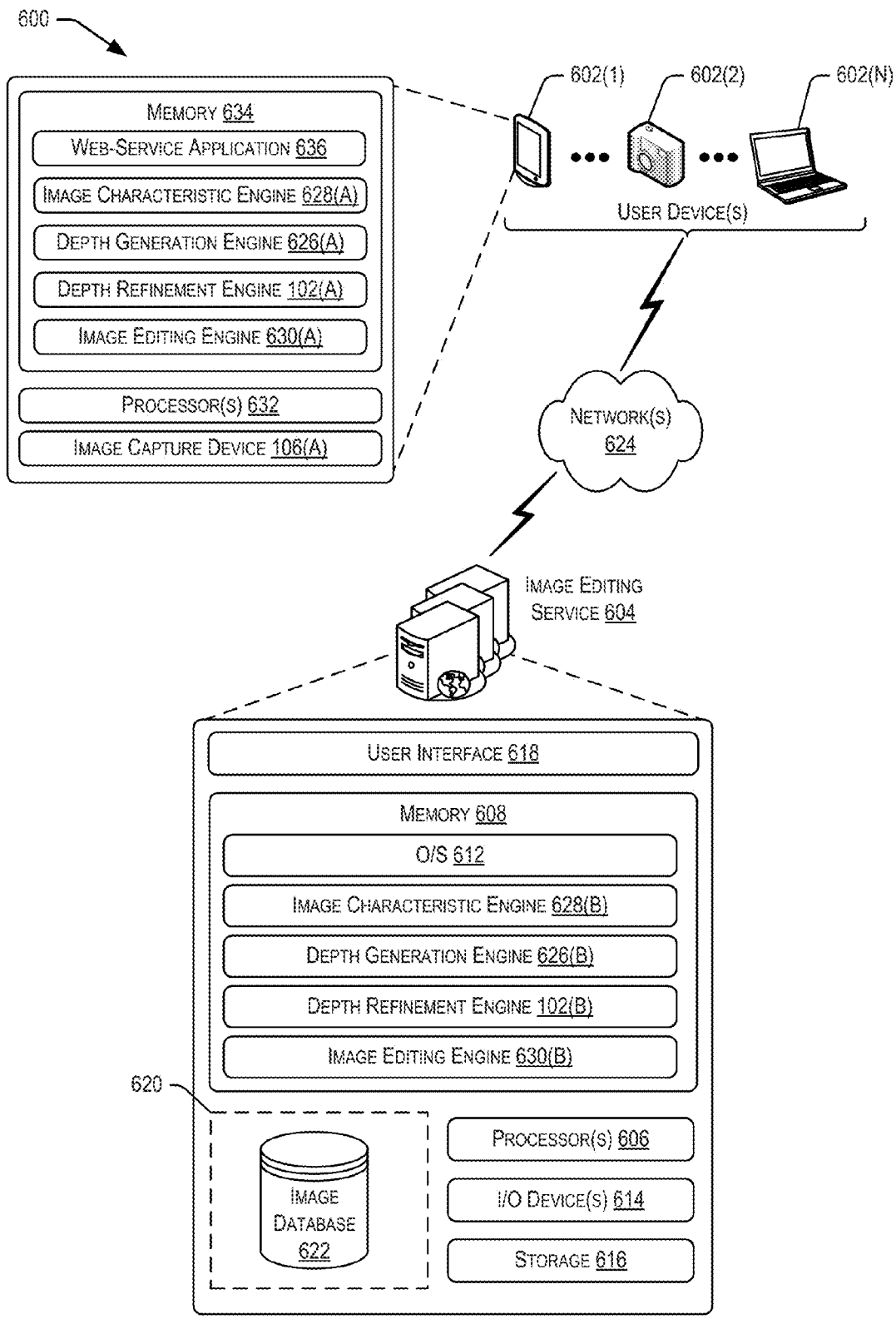
FIG. 6 is a diagram depicting an example network environment including user devices and an example image editing service for implementing techniques relating to determining depth refinement image capture instructions for use in depth map refinement according to at least one embodiment.

FIG. 6 illustrates example architecture 600 for implementing techniques relating determining depth refinement image capture instructions for improving an existing depth map 104 as described herein. The architecture 600 includes one or more user devices 602(1)-602(N) (hereinafter, "the user device 602") in communication with an image editing service 604 via networks(s) 624 (hereinafter, "the network 624"). The network 624 includes any one or a combination of many different types of networks, such as cable networks, the Internet, wireless networks, cellular networks, radio networks, and other private and/or public networks.

A user device 602 may be any suitable device capable of capturing an image and/or performing one or more operations on images. In some examples, the user device 602 is any suitable computing device such as, but not limited to, digital camera, a mobile phone, a smart phone, a personal digital assistant (PDA), a laptop computer, a personal computer, a desktop computer, a set-top box, a thin-client device, or other computing device. The user device 602 is utilized by one or more users (not shown) for interacting with the image editing service 604.

The user device 602 therefore includes a processor 632 that is communicatively coupled to a memory 634 and that executes computer-executable program code and/or accesses information stored in the memory 634. In some examples, the memory 634 stores a web-service application 632 and one or more engines (e.g., an image characteristic engine 628(A), a depth generation engine 626(A), the depth refinement engine 102(A), an image editing engine 630(A), a web-services application 636). The processor 632 may be a microprocessor, an application-specific integrated circuit ("ASIC"), a state machine, or other processing device. The processor 632 may also include any of a number of processing devices, including one. Such a processor 632 can include or may be in communication with a computer-readable medium storing instructions that, when executed by the processor 632, cause the processor 632 to perform the operations described herein. The web-service application 636 may enable the user to interact with the image editing service 604 over the network 624. The user device 602 also comprises an image capture device 106(A). The image capture device 106(A) is configured to capture one or more images. In some examples, the image capture device 106(A) comprises a conventional digital camera including a lens, aperture setting, focus setting, an infrared projector, and/or a structured light device. Any uses of "digital camera" throughout this specification are for illustrative purposes only and a person of ordinary skill in the art would understand that such term may generally be used to refer to any image capture device 106 executed by or integrated with any one of the user devices 602(1)-602(N) or any similar device. Therefore, the terms "digital camera" and "user device" may sometimes be used generically and interchangeably herein. In some examples, the user device 602(1) is a digital camera and may be configured with the image capture device 106(A) in order to capture images, but may not include any or some of the engines. In this example, the user device 602(1) (or an operator of the user device 602(1)) is provided with the depth refinement image capture instructions 108 to use while capturing the images 118 using the image capture device 106(A).

The image editing service 604 includes a processor 606 that is communicatively coupled to a memory 608 and that executes computer-executable program code and/or accesses information stored in the memory 608. In some examples, the memory 608 stores an operating system 612 and one or more engines (e.g., the image characteristic engine 628(A), the depth generation engine 626(B), the depth refinement engine 102(B), and the image editing engine 620(B)). The operating system 612 comprises any suitable operating system configured for interacting with the image editing service 604. The processor 606 comprises a microprocessor, an ASIC, a state machine, or other processing device. The processor 606 also comprises any of a number of processing devices, including one. Such a processor can include or may be in communication with a computer-readable medium storing instructions that, when executed by the processor 606, cause the processor to perform the operations described herein.

The memory 608 comprises any suitable computer-readable medium. The computer-readable medium may include any electronic, optical, magnetic, or other storage device capable of providing a processor with computer-readable instructions or other program code. A computer-readable medium may include, for example, a magnetic disk, memory chip, ROM, RAM, an ASIC, a configured processor, optical storage, magnetic tape or other magnetic storage, or any other medium from which a computer processor can read instructions. The instructions may include processor-specific instructions determined by a compiler and/or an interpreter from code written in any suitable computer-programming language, including, for example, C, C++, C#, Visual Basic, Java, Python, Perl, JavaScript, and ActionScript.

The image editing service 604 also includes a number of external or internal devices such as input or output devices. For example, the image editing service 604 includes input/output (I/O) device(s) and/or ports 614, such as for enabling connection with a keyboard, a mouse, a pen, a voice input device, a touch input device, a display, speakers, a printer, or other I/O device. The image editing service 604 also includes additional storage 616, which may include removable storage and/or non-removable storage. The additional storage 616 may include, but is not limited to, magnetic storage, optical disks, and/or tape storage. The disk drives and their associated computer-readable media may provide non-volatile storage of computer-readable instructions, data structures, program modules, and other data. The image editing service 604 also includes a user interface 618. The user interface 618 is utilized by an operator, or other authorized user to access portions of the image editing service 604. In some examples, the user interface 618 includes a graphical user interface, web-based applications, programmatic interfaces such as application programming interfaces (APIs), or other user interface configurations. The image editing service 604 also includes data store 620. The data store 620 comprises data structures for storing information related to the implementation of the techniques described herein. Such information is stored in image database 622. Within the image database 622 is stored input images, depth maps, depth likelihood maps, voting maps, measures of uncertainty, together with their associated information, and any other suitable data related to implementing the techniques described herein.

The depth generation engines 626(A), 626(B) are configured to generate depth maps based on a plurality of the images 118 captured by the image capture device 106 or captured by another image capture device and provided to one of the user devices 602(1)-602(N) or the image editing service 604. In some examples, the depth generation engines 626(A), 626(B) perform one or more operations to generate depth maps in accordance with techniques described in U.S. application Ser. No. 14/552,332 filed on Nov. 24, 2014, the entirety of which is hereby incorporated by reference. For example, as discussed in more detail in U.S. application Ser. No. 14/552,332, the depth generation engines 626(A), 626(B) may generate depth maps, depth likelihood maps, all-in-focus images, and measures of uncertainty. In some examples, after at least one depth refinement image capture instruction 108 has been generated and at least one additional image has been captured, the depth generation engines 626(A), 626(B) operating as discussed in U.S. application Ser. No. 14/552,332 may generate a refined depth map, a refined depth likelihood map, a refined all-in-focus image, and/or a refined measure of uncertainty. At least a portion of the refined depth map, the refined depth likelihood map, the refined all-in-focus images, and the refined measure of uncertainty may then be inputted into the depth refinement engine 102 to further refined the refined depth map. In this manner, depth refinement may be iterative.

The image characteristic engines 628(A), 628(B) are configured to determine image capture instructions for capturing images that can be used to generate a depth map such as the existing depth map 104. In some examples, the image characteristic engines 628(A), 628(B) perform one or more operations to generate image capture instructions in accordance with techniques described in co-pending U.S. application Ser. No. 14/577,792 filed concurrently herewith. For example, as discussed in more detail in U.S. application Ser. No. 14/577,792, the image capture instructions determined by the image characteristic engines 628(A), 628(B) identify a quantity of images and the aperture settings and/or focus settings to be used to capture them such that a quality depth map can be generated from the images. In some examples, one of the image characteristic engines 628(A), 628(B), is used to determine image capture instructions. The images captured according to those instructions are provided to one of the depth generation engines 626(A), 626(B) and a depth map is generated. In some examples, the depth map, along with other data, is provided to one of the depth refinement engines 102(A), 102(B) where depth refinement image capture instructions 108 are determined for refining the depth map.

The image editing engines 630(A), 630(B) are configured to perform one or more operations relating to image editing. For example, after the images 118 have been captured in accordance with the image capture instructions 108 and a depth map has been generated (and optionally refined), one of the image editing engines 630(A), 630(B) are utilized to edit an image corresponding to the depth map. As noted previously, the depth map may be stored as a separate file associated with the image or may be included as data or metadata within the image file.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

We claim:

1. A computer-implemented method for determining depth refinement image capture instructions by predictively determining configuration settings to be used by a camera to capture at least one next image of a scene for refining depth estimates in an existing depth map corresponding to an existing image of the scene, the method comprising:

identifying, by a computer system, a plurality of image patches of the existing image;

determining, by the computer system, a depth range corresponding to each of the image patches, the depth range comprising possible depth values for the corresponding image patch;

evaluating, by the computer system, each of the images patches using each of a plurality of configuration settings at each of the corresponding possible depth values to determine an amount of possible increase in depth precision for the image patch that can be achieved by accounting for additional depth information from the at least one next image of the scene if captured by the camera using the configuration setting, each of the configuration settings including at least one of an aperture setting and a focus setting; and generating, by the computer system, and based on the amount of possible increase in depth precision for each image patch, at least one depth refinement image capture instruction, each depth refinement image capture instruction including at least one of the configuration settings, wherein the additional depth information derived from the at least one next image when captured using the at least one of the configuration settings will result in an increase in depth precision for at least one depth estimate in the existing depth map.

2. The computer-implemented method of claim 1, wherein the depth range is determined based at least in part on at least one of a measure of uncertainty and a depth likelihood map.

3. The computer-implemented method of claim 1, wherein evaluating each of the image patches using each of the configuration settings at each of the possible depth values in the corresponding depth range includes:

identifying a blur kernel corresponding to each of the possible depth values and the configuration setting;

for each blur kernel, determining a simulated image patch by blurring an all-in-focus image patch of an all-in-focus image with the blur kernel, the simulated image patch corresponding to the image patch of the existing image; and determining, based on the simulated image patches, the amount of possible increase in depth precision for the image patch for each configuration setting.

4. The computer-implemented method of claim 1, wherein evaluating each of the image patches using each of the configuration settings at each of the possible depth values in the corresponding depth range includes:

identifying a blur kernel corresponding to each of the possible depth values and the configuration setting;

for each blur kernel, determining a simulated image patch by blurring an all-in-focus image patch of an all-in-focus image with the blur kernel, the simulated image patch corresponding to the image patch of the existing image; and determining, based on the simulated image patches, the amount of possible increase in depth precision for the image patch for each of the configuration settings by:

determining a measure of distance between patch appearances for each pair of simulated image patches corresponding to adjacent possible depth values; and summing the measures of distance, wherein the sum of the measure of distances corresponds to the amount of possible increase in depth precision for the image patch.

5. The computer-implemented method of claim 1, wherein the amount of possible increase in depth precision for each image patch is used to generate a voting map, the voting map accounting for a correspondence of the configuration settings and the amount of possible increase in depth precision at each pixel represented in the existing depth map, and wherein generating the depth refinement image capture instructions is based on the voting map.

6. The computer-implemented method of claim 1, further comprising:

capturing the at least one next image in accordance with the depth refinement image capture instructions; and generating a refined depth map using at least the at least one next image, and wherein the refined depth map includes at least one depth estimate that is more precise than the at least one depth estimate in the existing depth map.

7. The computer-implemented method of claim 1, further comprising receiving an input, the input comprising at least one of a minimum amount of possible increase in depth precision for the existing depth map, a total quantity of additional images to capture, and a total amount of time for capturing additional images, and wherein generating the depth refinement image capture instructions is performed in accordance with the input.

8. One or more computer-readable storage devices for storing computer-executable instructions that, when executed by one or more computer systems, configure the one or more computer systems to determine depth refinement image capture instructions by predictively determining configuration settings to be used by a camera to capture at least one next image of a scene for refining depth estimates in an existing depth map corresponding to an existing image of the scene by performing operations comprising:

identifying a plurality of image patches of the existing image;

determining a depth range corresponding to each of the image patches, the depth range comprising possible depth values for the corresponding image patch;

evaluating each of the images patches using each of a plurality of configuration settings at each of the corresponding possible depth values to determine an amount of possible increase in depth precision for the image patch that can be achieved by accounting for additional depth information from the at least one next image of the scene if captured by the camera using the configuration setting, each of the configuration settings including at least one of an aperture setting and a focus setting; and generating, based on the amount of possible increase in depth precision for each image patch, at least one depth refinement image capture instruction, each depth refinement image capture instruction including at least one of the configuration settings, wherein the additional depth information derived from the at least one next image when captured using the at least one of the configuration settings will result in an increase in depth precision for at least one depth estimate in the existing depth map.

9. The one or more computer-readable storage devices of claim 8, wherein the additional depth information provided by the at least one next image when captured using the at least one of the configuration settings provides an increase in depth discriminability between the possible depth values in the depth range for the image patch corresponding to the at least one depth estimate.

10. The one or more computer-readable storage devices of claim 8, wherein evaluating each of the image patches using each of the configuration settings at each of the possible depth values in the corresponding depth range includes:

identifying a blur kernel corresponding to each of the possible depth values and the configuration setting;

for each blur kernel, determining a simulated image patch by blurring an all-in-focus image patch of an all-in-focus image with the blur kernel, the simulated image patch corresponding to the image patch of the existing image; and determining, based on the simulated image patches, the amount of possible increase in depth precision for the image patch for each of the configuration settings.

11. The one or more computer-readable storage devices of claim 8, wherein evaluating each of the image patches using each of the configuration settings at each of the possible depth values in the corresponding depth range includes:

identifying a blur kernel corresponding to each of the possible depth values and the configuration setting;

for each blur kernel, determining a simulated image patch by blurring an all-in-focus image patch of an all-in-focus image with the blur kernel, the simulated image patch corresponding to the image patch of the existing image; and determining, based on the simulated image patches, the amount of possible increase in depth precision for the image patch for each of the configuration settings by:

determining a measure of distance between patch appearances for each pair of simulated image patches corresponding to adjacent possible depth values; and summing the measures of distance, wherein the sum of the measures of distance corresponds to the amount of possible increase in depth precision for the image patch.

12. The one or more computer-readable storage devices of claim 8, wherein the amount of possible increase in depth precision for each image patch is used to generate a voting map, the voting map accounting for a correspondence of the configuration settings and the amount of possible increase in depth precision at each pixel represented in the existing depth map, and wherein generating the depth refinement image capture instructions is based on the voting map.

13. The one or more computer-readable storage devices of claim 8, further comprising:
    capturing the at least one next image in accordance with the depth refinement image capture instructions; and
    generating a refined depth map using at least the at least one next image, and wherein the refined depth map includes at least one depth estimate that is more precise than the at least one depth estimate in the existing depth map.

14. The one or more computer-readable storage devices of claim 8, wherein the depth range is determined based at least in part on at least one of a measure of uncertainty and a depth likelihood map.

15. A system for determining depth refinement image capture instructions by predictively determining configuration settings to be used by a camera to capture at least one next image of a scene for refining depth estimates in an existing depth map corresponding to an existing image of the scene, the system comprising:
    memory that stores computer-executable instructions; and
    at least one processor configured to access the memory and execute the computer-executable instructions to cause the system to perform operations comprising:
        identifying a plurality of image patches of the existing image;
        determining a depth range corresponding to each of the image patches, the depth range comprising possible depth values for the corresponding image patch;
        evaluating each of the images patches using each of a plurality of configuration settings at each of the corresponding possible depth values to determine an amount of possible increase in depth precision for the image patch that can be achieved by accounting for additional depth information from the at least one next image of the scene if captured by the camera using the configuration setting, each of the configuration settings including at least one of an aperture setting and a focus setting; and
        generating, based on the amount of possible increase in depth precision for each image patch, at least one depth refinement image capture instruction, each depth refinement image capture instruction including at least one of the configuration settings, wherein the additional depth information derived from the at least one next image when captured using the at least one of the configuration settings will result in an increase in depth precision for at least one depth estimate in the existing depth map.

16. The system of claim 15, wherein the additional depth information provided by the at least next image when captured using the at least one of the configuration settings provides an increase in depth discriminability between the possible depth values in the depth range for the image patch corresponding to the at least one depth estimate.

17. The system of claim 15, wherein evaluating each of the image patches using each of the configuration settings at each of the possible depth values in the corresponding depth range includes:
    identifying a blur kernel corresponding to each of the possible depth values and the configuration setting;
    for each blur kernel, determining a simulated image patch by blurring an all-in-focus image patch of an all-in-focus image with the blur kernel, the simulated image patch corresponding to the image patch of the existing image; and
    determining, based on the simulated image patches, the amount of possible increase in depth precision for the image patch for each of the configuration settings.

18. The system of claim 15, wherein the amount of possible increase in depth precision for each image patch is used to generate a voting map, the voting map accounting for a correspondence of the configuration settings and the amount of possible increase in depth precision at each pixel represented in the existing depth map, and wherein generating the depth refinement image capture instructions is based on the voting map.

19. The system of claim 15, further comprising:
    capturing the at least one next image in accordance with the depth refinement image capture instructions; and
    generating a refined depth map using at least the at least one next image, and wherein the refined depth map includes at least one depth estimate that is more precise than the at least one depth estimate in the existing depth map.

20. The system of claim 15, wherein the depth range is determined based at least in part on at least one of a measure of uncertainty and a depth likelihood map.

* * * * *